United States Patent [19]

Clark

[11] 4,295,238

[45] Oct. 20, 1981

[54] FOOTWEAR

[75] Inventor: Lancelot P. Clark, Street, England

[73] Assignee: Clarks Limited, Street, England

[21] Appl. No.: 94,921

[22] Filed: Nov. 16, 1979

[30] Foreign Application Priority Data

Nov. 17, 1978 [GB] United Kingdom ............... 45098/78

[51] Int. Cl.³ ...................... A43D 9/00; A43C 13/08; A43B 23/00
[52] U.S. Cl. .................................. 12/142 RS; 36/14; 36/45; 36/83
[58] Field of Search ........... 12/142 R, 142 T, 142 RS, 12/142 EV, 142 E; 36/14, 45, 46.5, 83, 15

[56] References Cited

U.S. PATENT DOCUMENTS

| 3,812,604 | 5/1974 | Sato | 36/14 |
| 4,156,947 | 6/1979 | Nadler | 36/83 |
| 4,170,802 | 10/1979 | Roy | 12/142 RS |

Primary Examiner—Patrick D. Lawson
Attorney, Agent, or Firm—Wenderoth, Lind & Ponack

[57] ABSTRACT

A boot or shoe comprises a pre-formed portion and a portion which is moulded in one piece on to the pre-formed portion and which includes the sole unit and those parts of the upper not constituted by the pre-formed portion. The pre-formed portion comprises side panels extending along each side of the shoe and a sock for underlying the foot, which sock interconnects the side panels and the side panels and sock may be made in one piece or in separate pieces which are fastened together, as by sewing, before the moulded portion is moulded on to the pre-formed portion. The moulded portion is made from a plastics material, e.g. polyurethane, and the material does not overlap the inner face of the pre-formed portion but overlaps at least some of the marginal regions of the two side panels. The sock lies in the top surface of the sole unit. The two side panels may together extend also round the heel region of the upper and the plastics material may cover the outer face of the panels in the heel region. The location at which the side panels join the sock, e.g. in a sea, is embedded in the sole unit. The specification describes also the method of manufacture of the boot or shoe.

3 Claims, 14 Drawing Figures

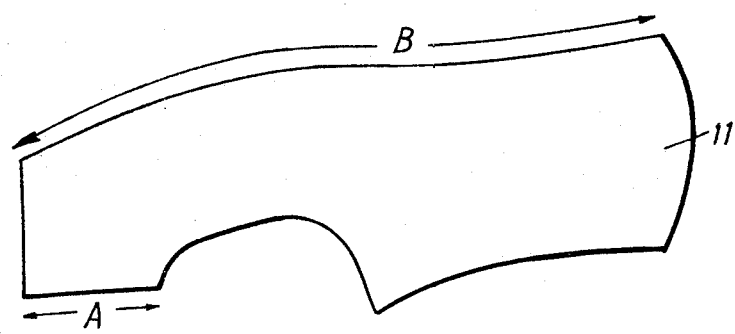
FIG.1
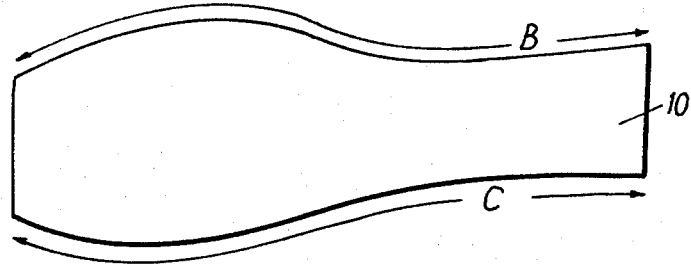
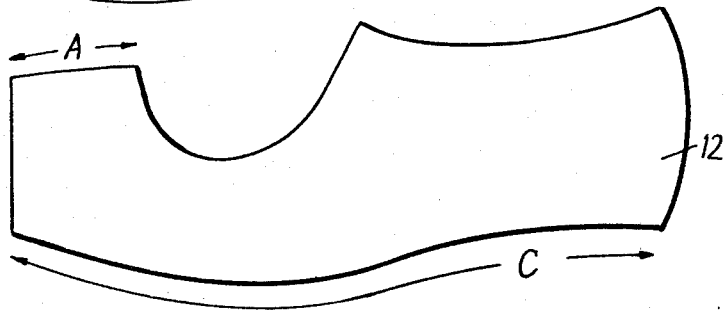
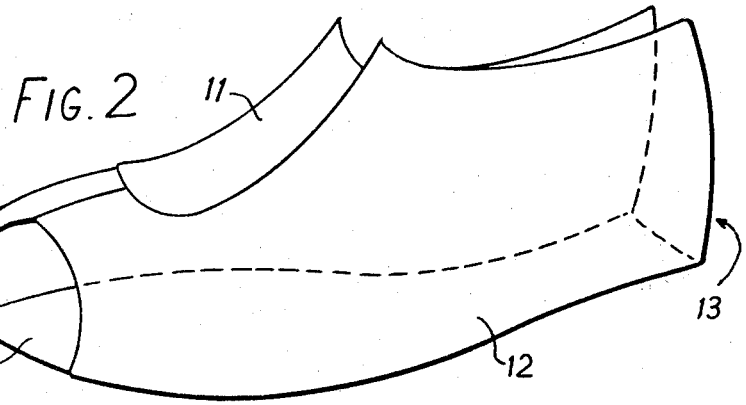
FIG.2

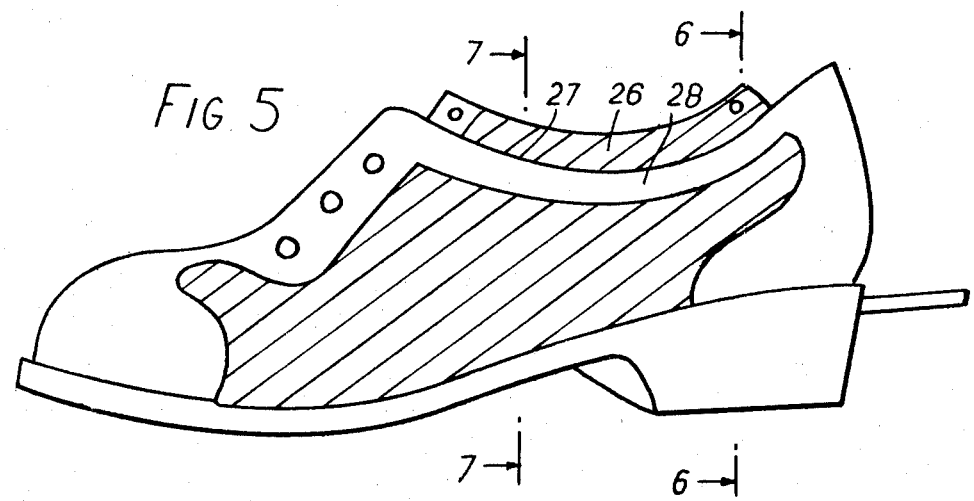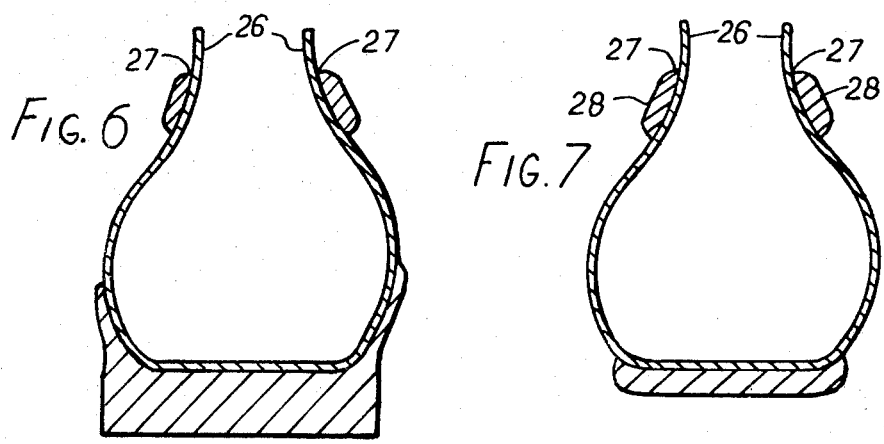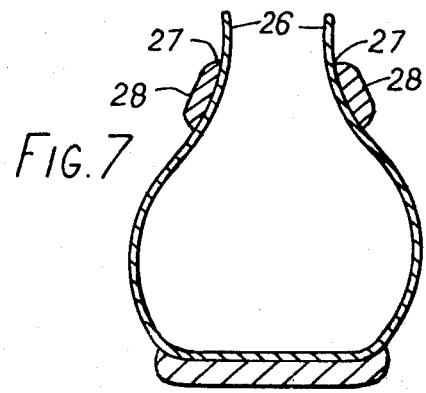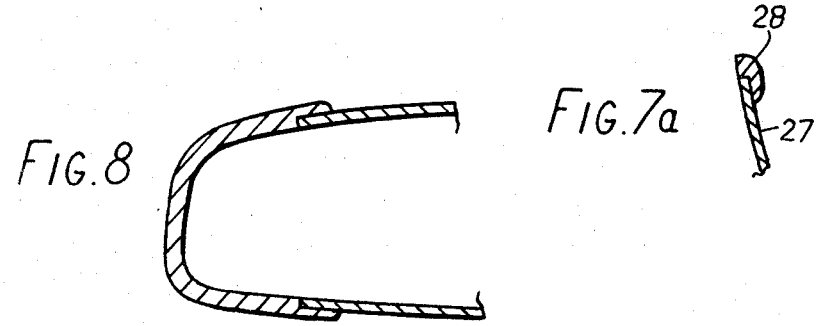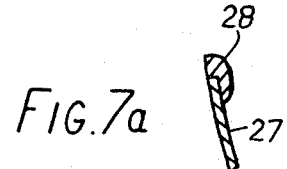

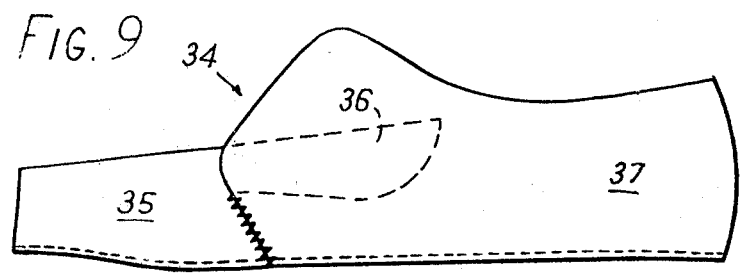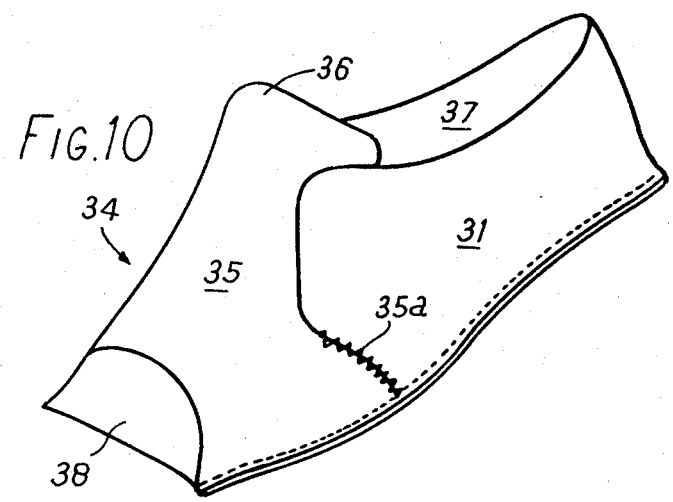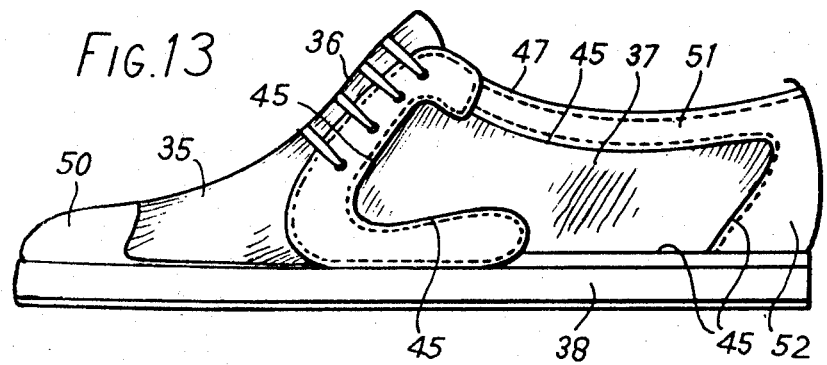

FOOTWEAR

This invention relates to the manufacture of articles of footwear such as boots, shoes, sandals and clogs.

According to this invention there is provided a method of making an article of footwear comprising pre-forming from flexible sheet material (e.g. leather) a component which provides a sock for underlying the foot and one part of an upper which part comprises two side panels to extend respectively along opposite sides of the foot, the sock and side panels being formed either integrally with each other or in separate pieces which are connected together to form said component, placing said component on a last which defines the internal shape of the finished article, then enclosing the last and said component in a cavity mould having within it sealing knife edges which serve to nip said part of the upper to the last at locations adjacent but spaced from the edges of said part of the upper and to close the cavity of the mould, said cavity mould being shaped in relation to the last and said component to define therewith a sole unit and, integrally with the sole unit, the remaining part or parts of the upper, and injecting into the mould cavity a plastics material in a settable liquid form, thereby in a single moulding operation to form the sole unit of the article and the remaining part or parts of the upper, the plastics material also overlying the edge portions of said one part of the upper on the outer face thereof.

The invention also provides an article of footwear having an upper whereof one part comprises two panels arranged to extend respectively on opposite sides of the foot of the wearer, a sock for underlying the foot, the side panels being preformed with the sock from flexible sheet material (e.g. leather) either integrally with each other or in separate pieces which are connected together to form a single component, and a plastics sole unit moulded integrally with the remaining part or parts of the upper on to said one part and the sock, said remaining part or parts of the upper overlapping marginal portions of the outer but not the inner faces of the side panels, whereby the sock and side panels lie wholly in the inner surface of the article.

It is possible, by applying a suitable adhesive to the underside of the sock panel and/or to the marginal portions of the side panels before securing them to the last, to use various materials for the panels and as the said plastics materials. Excellent results are obtained, however, when the sheet material is leather and the plastics material is polyurethane, since it is then found that the two materials form an excellent adhesive bond with each other during the moulding step without the need for the preliminary application of an adhesive to the panels, and without the need to punch holes in the margins of the leather to provide a mechanical key with the polyurethane.

The invention will now be described in more detail with reference by way of example to the accompanying diagrammatic drawings in which:

FIG. 1 illustrates the components of a shell component for use in the method,

FIG. 2 shows the completed shell component,

FIG. 5 shows the finished shoe as extracted from the mould,

FIGS. 6 and 7 are sectional views of the shoe on the planes 6—6 and 7—7 of FIG. 5, FIG. 7a illustrates a modification of FIGS. 6 and 7, FIG. 8 is a view of a horizontal section plane at the heel or toe end of the shoe of FIG. 5, FIGS. 9 and 10 are respectively side and perspective views of a shell component for use in a development of the method described in relation to FIGS. 1 to 8, FIGS. 11 and 12 are views corresponding to FIGS. 8 and 9 respectively, showing the shell disposed on a last, and FIG. 13 shows the finished shoe made by the method described in relation to FIGS. 9 to 12.

Figure 3:
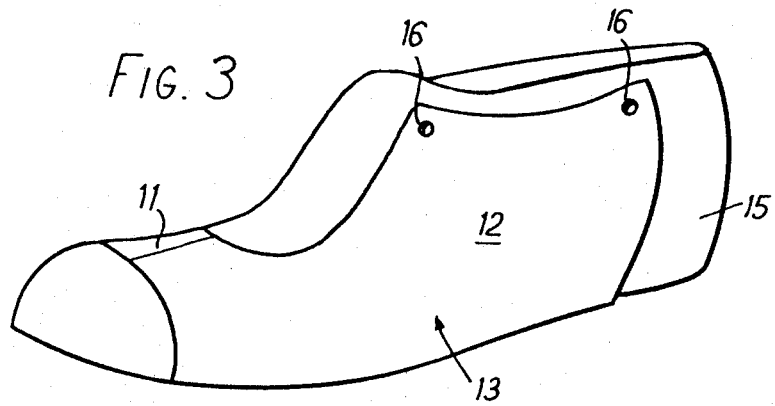
FIG. 3 shows the shell component secured to a last.

Referring to FIG. 1 of the drawings, a sock 10 and two side panels 11, 12 are cut from leather and are then sewn together to form a shell component 13 as shown in FIG. 2. For this the two edges A of panels 11, 12 are sewn together, the two edges B of panels 10, 11 are sewn together, and the two edges C of panels 10, 12 are sewn together. The shell component is then fitted on to a making last 15 as shown in FIG. 3. Locating lugs 16 may be provided on the last and engaged in two holes punched in each of the side panels to hold the shell firmly in position. It has however been found that if the fit of the shell component on the last is good the shell component will stay in the correct position without the need for the lugs and holes. The external profile of the last corresponds to the internal shape of the finished shoe.

Figure 4:
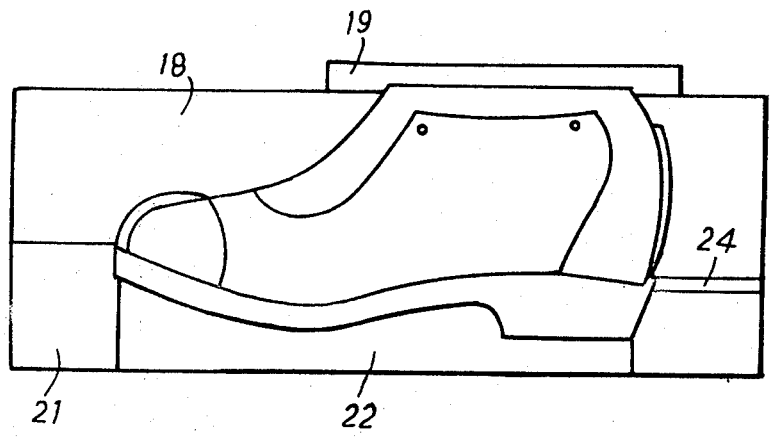
FIG. 4 shows the last and shell component enclosed in a cavity mould.

The last carrying the shell component is then placed in a cavity mould as shown in FIG. 4, designed to mould in one operation the whole of the shpe (including the sole unit) not constituted by the shell component. The cavity mould shown comprises two upper mould halves 18 disposed on opposite sides of the central lengthwise vertical plane of the shoe, a top cavity closure plate 19, and a bottom mould section 21 incorporating a vertically slidable base member 22 to shape the sole unit. Where the side panels do not extend, there is a narrow gap between the last and the parts of the cavity wall provided by the mould halves 18, so that the polyurethane can fill the gap and form those parts of the upper not constituted by the side panels. Sealing knife edges set into the internal surfaces of the two mould halves 18 pinch the side panels 11, 12 against the last 15 along the whole length of the periphery of the side panels 11, 12 but spaced back from the edges of the panels, to form a seal but to allow the liquid polyurethane which is injected into the mould cavity through the injection hole 24 to overlap and become adhesively bonded to the marginal portions of the outer face of the panels. The part of the shell component extending in the instep region of the shoe is, by appropriate design of the mould halves, covered with polyurethane during the moulding step as can be seen in FIG. 5, which shows the shoe as extracted from the mould. The top edge portion 26 of each of the side panels projects above the top line 27 (FIGS. 5 to 7), as defined by the layer of polyurethane overlying the adjacent margin of the panel and indicated at 28, and the two portions 26 are trimmed off, together with any polyurethane flashing. Portions corresponding to portions 26 may however be retained, for purposes of appearance for example, in cases where the shell component is self-supporting on the last, i.e. where lugs 16 are not employed.

Any shank and/or heel block required to be incorporated in the sole unit 30 is placed in the mould before the polyurethane is injected.

In FIG. 5, the areas of polyurethane in the finished shoe are shown unhatched whilst the leather side panels are shown cross-hatched. It will thus be seen that the facings, part of the toecap area, the heel area and the top-line margin of the upper are covered externally with polyurethane, and FIG. 8 illustrates how the polyurethane overlaps and forms an adhesive bond with the marginal portions of the leather side panels on their outer faces. The adhesive bond is very strong and does not need to be supplemented by a mechanical keying action such as could be obtained by punching holes along the margins of the side panels. The plastics material does not overlap the inner faces of the panels but forms a smooth continuation of these faces.

In an alternative construction the sealing knives which extend along and effectively defines the position of the top line are spaced above the top edge of the side panels 37 and seal against the last, so that in the finished shoe the polyurethane extends above the top edges of the side panels 37 as illustrated in FIG. 7a. Again, however, the polyurethane does not overlap the inner faces of the panels.

In the application of the invention to the manufacture of a clog, e.g. an article of footwear having a substantially rigid sole which is shaped to allow it to rock as the wearer walks, and an upper which extends across the instep or forepart of the foot and which has no heel, the rigid sole unit is moulded from polyurethane and the upper is constituted by a piece of sheet material, preferably leather, extending across the forepart of the foot, the lower marginal portions of the upper being moulded into the sole unit or into an upward flange of the sole unit, and the rear marginal edge portion of the outer face of the upper being covered by a band of polyurethane moulded on to the upper integrally with the sole unit.

Referring now to FIGS. 9 to 13, a further development of the method is shown by which a Derby shoe can be made (see FIG. 13) which has a vamp 35, including a tongue 36, as well as two quarters 37 all made from leather, and the remainder of the shoe including the sole unit 38 made in a single moulding step, and all in one piece, from polyurethane. In some cases it may be necessary to incorporate a reinforcing shank in the sole unit, in which case the shank will be mounted in the cavity mould in known manner prior to the moulding step.

FIGS. 9 and 10 show the initial shell 34 made from pieces of leather sewn together and consisting of the two quarters 37 and vamp 35 having their bottom edges turned outward and sewn to a sack 38. Stitching 35a secures the lower part of the vamp to the quarter but stops short of tongue 36. The vamp stops short of the toe as shown.

Figure 11:
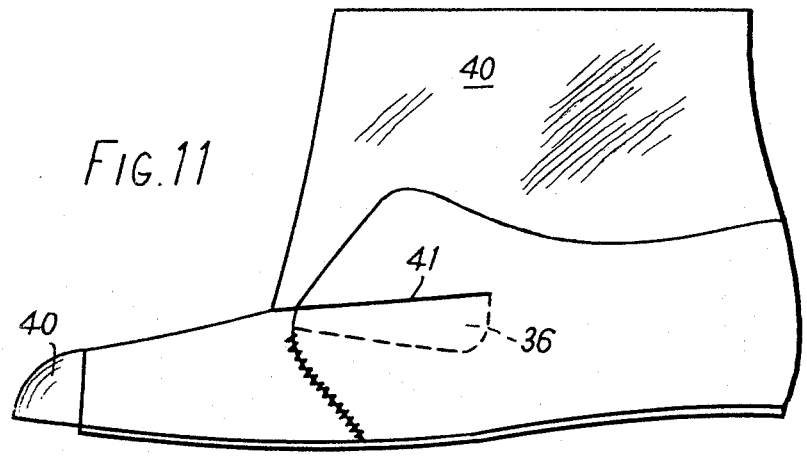
Figure 12:
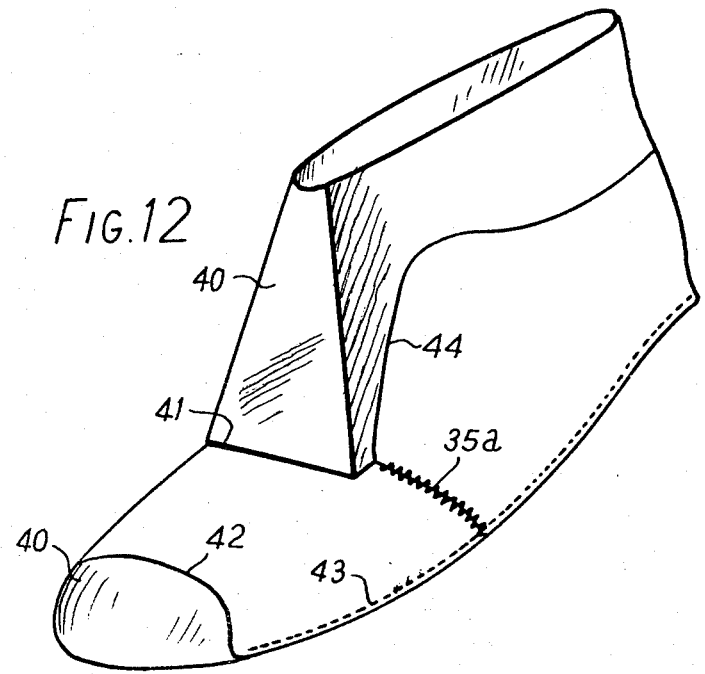

The shell is then mounted on a last 40 which defines the internal shape of the finished shoe. The last has in its front face a slot 41 to receive the tongue 36 as shown in FIGS. 11 and 12. The last may alternatively have a shallow recess in its front face to receive the tongue. The last 40 carrying the shell 34 is then disposed in a cavity mould (not shown) which is shaped to provide a cavity about the last and shell, this cavity forming the sole unit and being bounded, where it extends about the upper, by sealing knives incorporated in the mould. The sealing knives are disposed so as to engage sealingly against the outer face of the shell at locations spaced back from the extreme edge of the shell along the front edge portion 42 of the vamp, along the bottom edges of the vamp above the line of stitching 43, upward forwardly of stitching 35a thence adjacent the front edge 44 of the front edges of the two facings and along the full length of the top-line of the shoe. A sealing knife at each side of the mould also extends in a closed path indicated at 45 in FIG. 13 along the lower edge portion of the quarter at a location spaced above the line of stitching connecting it to the sock, in a line on the quarter spaced from the first said sealing knife, along below the first sealing knife where it extends along the top-line 47, and thence downward to the lower edge portions of the quarter. In this way, when liquid polyurethane is injected into the mould cavity and allowed to set, there are formed integrally with the sole unit a toe cap 50, a marginal band 51 on the front and top-line portions of each leather quarter, a counter 52 covering the face of the leather in that region, and a marginal band covering the whole length of the stitched junction of the vamp and quarters to the sock. The lower edge of the upper, where it is stitched to the sock, projects into the cavity for the sole, but no spacing means is employed to space the material from the cavity wall; in general the amount of material beyond the seam will be made insufficient to reach the cavity wall. As in the construction shown in FIGS. 5 to 7, a narrow band of leather may be trimmed off above the top-line 47 of the shoe, but may if preferred be retained to form the top-line. A narrow band of leather is also trimmed off along the front edge of the facings. If desired the polyurethane may extend above the side panels, so as to form the top-line zone, as indicated in FIG. 7a, by appropriate positioning of the appropriate sealing knives.

What is claimed is:

1. A method of making an article of footwear comprising pre-forming from flexible sheet material a component which provides a sock for underlying the foot and one part of an upper, which part comprises two side panels to extend respectively along opposite sides of the foot, the sock and side panels being formed either integrally with each other or in separate pieces which are connected together to form said component, placing said component on a last which defines the internal shape of the finished article, then enclosing the last and said component in a cavity mould having within it sealing knife edges which serve to nip said part of the upper to the last at locations adjacent but spaced from the edges of said part of the upper and to close the cavity of the mould, said cavity mould being shaped in relation to the last and said component to define therewith a sole unit and, integrally with the sole unit, the remaining part or parts of the upper, and injecting into the mould cavity a plastics material in a settable liquid form thereby in a single moulding operation to form the sole unit of the article and the remaining part or parts of the upper, the plastics material also overlying edge portions of said one part of the upper on the outer face thereof.

2. A method as claimed in claim 1, wherein in the region corresponding to the top line of the article a knife edge nips each side panel to the last at a location spaced below the top edge of the panel and a second knife edge forms a seal with the last above said top edge of the panel, the arrangement being such that the top-line portion of the article is formed from the plastics material.

3. A method as claimed in claim 1, wherein the side panel is nipped to the last by two knife edges spaced below the top edge of the side panel so as together to form a band of plastics material extending along each of the side panels adjacent the top edge therefor, and comprising the step of trimming off the edge portion of each of the side panels which edge portion projects beyond the band.

* * * * *